H. MARSHALL.
SOLDERING IRON.
APPLICATION FILED APR. 26, 1909.
933,318.
Patented Sept. 7, 1909.
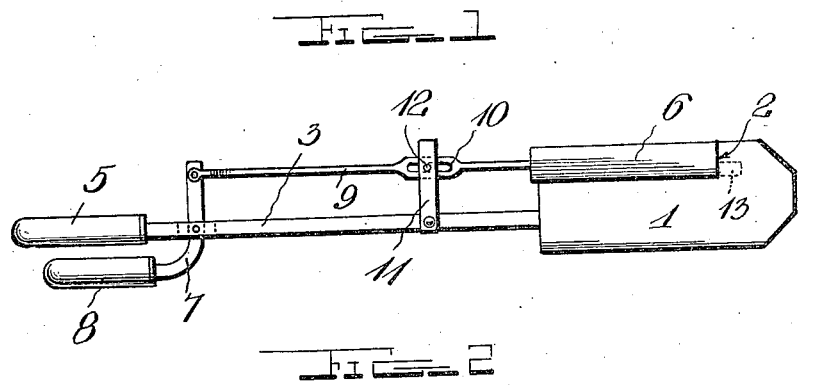
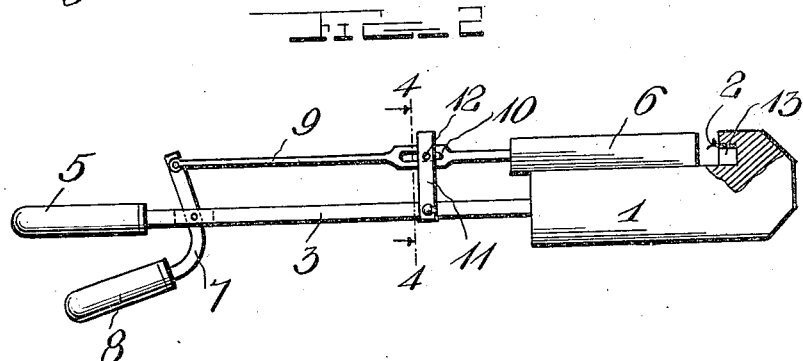
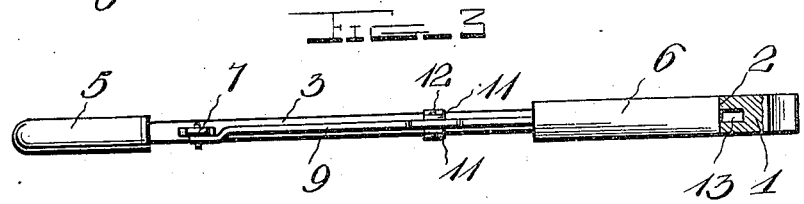
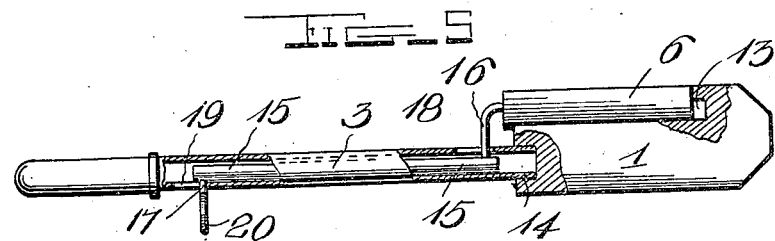
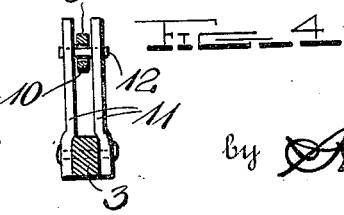
Inventor
Howard Marshall
by H. B. Willson & Co.
Attorneys
Witnesses
C. H. Griesbauer
ANDREW. B. GRAHAM CO., PHOTO-LITHOGRAPHERS, WASHINGTON, D. C.

UNITED STATES PATENT OFFICE.

HOWARD MARSHALL, OF KINGFISHER, OKLAHOMA.

SOLDERING-IRON.

933,318.

Specification of Letters Patent.   Patented Sept. 7, 1909.

Application filed April 26, 1909. Serial No. 492,196.

*To all whom it may concern:*

Be it known that I, HOWARD MARSHALL, a citizen of the United States, residing at Kingfisher, in the county of Kingfisher and State of Oklahoma, have invented certain new and useful Improvements in Soldering-Irons; and I do declare the following to be a full, clear, and exact description of the invention, such as will enable others skilled in the art to which it appertains to make and use the same.

This invention relates to a soldering iron and has for its object to provide a simple and economical device of this kind which may be very effectively used for soldering together electrical connections for wires such as are used in wiring houses.

By the use of any of the soldering irons now in use it is exceedingly difficult to solder connections close to ceilings and walls without getting soot on the same from the blow torch and to overcome these objections I have devised the present soldering iron by means of which the ends of wires may be readily soldered together without damaging the wall or ceiling and without burning the wire insulation.

A still further object of the invention is to provide a construction whereby the hole or recess in which the solder is placed will be covered by a movable jaw in order that the wall or such recess will not be formed with a coating of incrustation and will not have to be cleaned before soldering each connection.

With these and other objects in view, the invention consists of certain novel features of construction, combination and arrangement of parts as will be more fully described and particularly pointed out in the appended claims.

In the accompanying drawings, Figure 1 is a side elevation of a soldering iron embodying my improvements with the clamping jaw in closed position; Fig. 2 is a similar view with the clamping jaw in its other position; Fig. 3 is a plan view of the device; Fig. 4 is a vertical transverse section taken on line 4—4 of Fig. 2; and Fig. 5 is a view partly in longitudinal section of a modified form of invention.

Referring to the drawings for a more particular description of the invention, the soldering iron comprises a stationary or fixed jaw, 1, having its top face recessed from its inner end and for the greater portion of its length leaving a shoulder, 2, at the inner end of said recessed portion. The fixed jaw 1, is connected with the handle, 3, which in the present instance is in the nature of a rod, the outer end of the handle having a grip piece, 5. The movable jaw, 6, is mounted for longitudinal adjustment upon the recessed face of the fixed jaw and is provided with a curved operating handle, 7, which is pivoted to the handle, 3, and is provided at its outer end with the grip piece, 8. The pivoted end of the handle, 7, is connected with the movable jaw, 6, by a connecting link or rod, 9, provided between its ends with an enlarged longitudinally slotted portion, 10. A pair of upright laterally spaced guide lugs, 11, are secured at their inner ends to opposite sides of the handle, 3, and have extending between their outer ends the transverse guide pin, 12, which passes through the slotted portion, 10, of the connecting link or rod, 9. By this means the connecting rod, 9, and movable jaw are held against either vertical or lateral displacement. The shoulder, 2, of the fixed jaw is provided with a longitudinal recess, 13, for the reception of the solder.

In the operation of the device, the ends of the wires to be soldered together are first twisted together, and the soldering iron is then heated by a blast torch or other suitable means and the solder then placed in the recess, 13. This having been done the ends of the wires are placed against the shoulder, 2, and the movable jaw, 6, forced into engagement therewith. The iron is then passed back and forth over the twisted ends of the wires which allows the solder to pass out of the hole or recess, 13, on the twisted ends of the wires upon which it is evenly distributed.

As explained in the introductory remarks when the iron is heated the movable jaw is moved into engagement with the shoulder, 4, of the fixed jaw so that incrustation will not be formed upon the wall of said recess, 13, thus obviating the necessity of frequently cleaning out said recess.

In the modified form of the invention, the handle 3, is in the form of a tube which is screwed in an interiorly threaded socket, 14, formed in the inner end of the fixed jaw. The operating rod or link, 15, is mounted for longitudinal adjustment in said tube and is provided at opposite ends with oppositely extending extensions, 16 and 17, respectively, which extend through longitudinal guide slots, 18 and 19, formed in the tube. The extension, 16, is connected with the movable jaw, 6, while the outer end of the extension, 17, is provided with an eye or loop, 20, which is engaged by the finger during the operation of moving the sliding jaw.

From the foregoing description, taken in connection with the accompanying drawings, the construction and operation of the invention will be readily understood without requiring a more extended explanation.

Various changes in the form proportion and the minor details of construction may be resorted to without departing from the principle or sacrificing any of the advantages of this invention.

Having thus described my invention, what I claim is:—

1. A soldering iron of the class described comprising a fixed or stationary jaw having its top face recessed longitudinally leaving an abrupt shoulder near its outer end, said shoulder being formed in its face with a longitudinal recess adapted to receive a quantity of solder, a movable jaw mounted for longitudinal adjustment upon the recessed portion of the fixed jaw adapted to engage the shoulder thereof, a handle for the fixed jaw and means for operating the movable jaw.

2. A soldering iron of the class described, comprising a fixed or stationary jaw having its top face recessed longitudinally leaving an abrupt shoulder near its outer end, said shoulder being formed in its face with a longitudinal recess adapted to receive a quantity of solder, a movable jaw mounted for longitudinal adjustment upon the recessed portion of the fixed jaw adapted to engage the shoulder thereof, a handle for the fixed jaw, means for operating the movable jaw, said means comprising an operating handle pivoted to the stationary handle, and a connecting link between the pivoted end of the operating handle and the movable jaw.

3. A soldering iron of the class described, comprising a fixed jaw having a recessed face leaving a shoulder near its outer end, a movable jaw mounted upon the recessed face of the fixed jaw, a handle for the fixed jaw, an operating handle pivoted to the handle of the fixed jaw, a link provided with a longitudinal slot between the operating handle and the movable jaw, a pair of laterally spaced lugs secured to the handle of the fixed jaw, and a transverse guide pin extending between the outer ends of said lugs through the slot of said connecting link.

In testimony whereof I have hereunto set my hand in presence of two subscribing witnesses.

HOWARD MARSHALL.

Witnesses:
J. B. COCKRILL,
E. A. PEMBERTON.